the  US010130196B2

(12) United States Patent
Burns

(10) Patent No.: US 10,130,196 B2
(45) Date of Patent: Nov. 20, 2018

(54) PRODUCT DISPLAY SHELF, SYSTEM AND METHOD

(71) Applicant: Artform International Limited, Loughborough (GB)

(72) Inventor: Alistair Gordon Burns, Loughborough (GB)

(73) Assignee: Artform International Limited, Loughborough (GB)

(*) Notice: Subject to any disclaimer, the term of this patent is extended or adjusted under 35 U.S.C. 154(b) by 0 days.

(21) Appl. No.: 15/501,677

(22) PCT Filed: Aug. 7, 2015

(86) PCT No.: PCT/GB2015/052296
§ 371 (c)(1),
(2) Date: Feb. 3, 2017

(87) PCT Pub. No.: WO2016/020701
PCT Pub. Date: Feb. 11, 2016

(65) Prior Publication Data
US 2017/0224135 A1 Aug. 10, 2017

(30) Foreign Application Priority Data
Aug. 7, 2014 (GB) .................................. 1414037.0

(51) Int. Cl.
F21V 33/00 (2006.01)
F25D 27/00 (2006.01)
(Continued)

(52) U.S. Cl.
CPC ............ A47F 11/10 (2013.01); A47B 57/408 (2013.01); A47B 96/021 (2013.01); A47B 96/06 (2013.01);
(Continued)

(58) Field of Classification Search
CPC ..... A47B 57/408; A47B 96/021; A47B 96/06; A47B 2220/0077; A47F 1/12;
(Continued)

(56) References Cited

U.S. PATENT DOCUMENTS 2,510,944 A 6/1950 Auerbach
2,598,862 A 6/1952 Tonn
(Continued)

FOREIGN PATENT DOCUMENTS

CA 2781515 A1 12/2012
CN 2781936 Y 5/2006
(Continued)

OTHER PUBLICATIONS

Patent Treaty Cooperation, International Search Report and Written Opinion for PCT/GB2015/052296 dated Feb. 16, 2016 (pp. 17).
(Continued)

Primary Examiner — Jason Moon Han
(74) Attorney, Agent, or Firm — Fitch, Even, Tabin & Flannery LLP

(57) ABSTRACT

A product display shelf, system and method are disclosed. The product display system includes a shelf unit having a back shelf portion and a front shelf portion. The back shelf portion includes a first connecting element for releasably attaching the back shelf portion to an electrically powered support member, and the front shelf portion includes a second connecting element for releasably attaching the front shelf portion to the back shelf portion. The front shelf portion can also include a body portion and a display panel connected to or integral with the body portion, suitable for displaying information to a user.

13 Claims, 9 Drawing Sheets

(51) Int. Cl.

| | | |
|---|---|---|
| F27D 21/02 | (2006.01) | |
| A47F 11/10 | (2006.01) | |
| A47F 5/00 | (2006.01) | |
| A47B 96/02 | (2006.01) | |
| A47B 57/40 | (2006.01) | |
| A47F 1/12 | (2006.01) | |
| A47B 96/06 | (2006.01) | |
| A47F 5/10 | (2006.01) | |
| F21S 4/20 | (2016.01) | |
| F21V 23/06 | (2006.01) | |
| B33Y 50/00 | (2015.01) | |
| B33Y 80/00 | (2015.01) | |
| G09F 13/04 | (2006.01) | |
| F21Y 103/10 | (2016.01) | |
| F21Y 115/10 | (2016.01) | |
| G09F 13/22 | (2006.01) | |

(52) U.S. Cl.
CPC .............. *A47F 1/12* (2013.01); *A47F 5/0025* (2013.01); *A47F 5/0043* (2013.01); *A47F 5/10* (2013.01); *B33Y 50/00* (2014.12); *B33Y 80/00* (2014.12); *F21S 4/20* (2016.01); *F21V 23/06* (2013.01); *G09F 13/0413* (2013.01); *A47B 2220/0077* (2013.01); *A47B 2220/0091* (2013.01); *F21Y 2103/10* (2016.08); *F21Y 2115/10* (2016.08); *G09F 2013/045* (2013.01); *G09F 2013/222* (2013.01)

(58) Field of Classification Search
CPC ........ A47F 5/0025; A47F 5/0043; A47F 5/10; A47F 11/10; B33Y 50/00; B33Y 80/00; F21S 4/20; F21S 4/28; F21V 23/06; G09F 13/0413
USPC ..................... 362/92, 94, 640, 652, 655–659
See application file for complete search history.

(56) References Cited

U.S. PATENT DOCUMENTS

| | | | |
|---|---|---|---|
| 2,674,723 A | 4/1954 | Hurlbut | |
| 2,755,452 A | 7/1956 | Rogie | |
| 3,605,064 A | 9/1971 | Routh | |
| 3,622,938 A | 11/1971 | Ito | |
| 3,886,348 A | 5/1975 | Jonathan | |
| 4,018,497 A | 4/1977 | Bulanchuk | |
| 4,042,291 A | 8/1977 | Moriyama | |
| 4,245,874 A | 1/1981 | Bishop | |
| 4,502,103 A | 2/1985 | Collins | |
| 4,688,869 A | 8/1987 | Kelly | |
| 4,689,726 A | 8/1987 | Kretzschmar | |
| 4,736,279 A | 4/1988 | Yamai | |
| 4,747,025 A | 5/1988 | Barton | |
| 4,799,133 A | 1/1989 | Strzalko | |
| 4,886,462 A | 12/1989 | Fierro | |
| 4,973,796 A | 11/1990 | Dougherty | |
| 4,994,943 A | 2/1991 | Aspenwall | |
| 4,996,636 A | 2/1991 | Lovett | |
| 5,012,936 A | 5/1991 | Crum | |
| 5,022,720 A | 6/1991 | Fevig | |
| 5,034,861 A | 7/1991 | Sklenak | |
| 5,072,343 A | 12/1991 | Buers | |
| D330,090 S | 10/1992 | Walter | |
| 5,154,641 A | 10/1992 | McLaughlin | |
| 5,190,186 A | 3/1993 | Yablans | |
| 5,205,638 A | 4/1993 | Squitieri | |
| 5,334,037 A | 8/1994 | Gabrius | |
| 5,348,485 A | 9/1994 | Briechle | |
| 5,366,099 A | 11/1994 | Schmid | |
| 5,390,802 A | 2/1995 | Pappagallo | |
| 5,425,648 A * | 6/1995 | Farham | H01R 25/16 439/116 |
| 5,476,396 A | 12/1995 | De Castro | |
| 5,542,552 A | 8/1996 | Yablans | |
| 5,553,412 A | 9/1996 | Briechle | |
| 5,605,237 A | 2/1997 | Richardson | |
| 5,608,643 A | 3/1997 | Wichter | |
| 5,639,258 A | 6/1997 | Clark | |
| 5,649,363 A | 7/1997 | Rankin, VI | |
| 5,665,304 A | 9/1997 | Heinen | |
| 5,671,362 A | 9/1997 | Cowe | |
| 5,685,664 A | 11/1997 | Parham | |
| 5,690,415 A * | 11/1997 | Krehl | A47F 5/101 108/23 |
| 5,722,747 A | 3/1998 | Baron | |
| 5,722,847 A | 3/1998 | Haag | |
| 5,743,428 A | 4/1998 | Rankin, VI | |
| 5,758,585 A * | 6/1998 | Latchinian | A47B 96/067 108/108 |
| 5,791,487 A | 8/1998 | Dixon | |
| 5,816,696 A | 10/1998 | Beisler | |
| 5,831,515 A | 11/1998 | Stewart | |
| 5,839,588 A | 11/1998 | Hawkinson | |
| 5,855,283 A | 1/1999 | Johnson | |
| 5,881,910 A | 3/1999 | Rein | |
| 5,894,933 A | 4/1999 | Crews | |
| 5,902,034 A | 5/1999 | Santosuosso | |
| 5,902,150 A | 5/1999 | Sigl | |
| 5,915,824 A | 6/1999 | Straat | |
| 5,924,790 A | 7/1999 | Ponton | |
| 5,964,373 A | 10/1999 | Hucknall | |
| 5,992,652 A | 11/1999 | Springs | |
| 6,093,037 A | 7/2000 | Lin | |
| 6,142,317 A | 11/2000 | Merl | |
| 6,155,438 A | 12/2000 | Close | |
| 6,179,434 B1 | 1/2001 | Saraiji | |
| 6,181,299 B1 | 1/2001 | Frederick | |
| 6,196,648 B1 | 3/2001 | Henriott | |
| 6,231,205 B1 | 5/2001 | Slesinger | |
| D445,615 S | 7/2001 | Burke | |
| 6,254,247 B1 | 7/2001 | Carson | |
| 6,259,965 B1 | 7/2001 | Steele | |
| 6,269,285 B1 | 7/2001 | Mignault | |
| 6,276,810 B1 | 8/2001 | Vosshenrich | |
| 6,283,608 B1 | 9/2001 | Straat | |
| 6,302,557 B1 | 10/2001 | Santosuosso | |
| 6,325,523 B1 | 12/2001 | Santosuosso | |
| 6,351,964 B1 | 3/2002 | Brancheau | |
| 6,364,273 B1 | 4/2002 | Otema | |
| 6,375,015 B1 | 4/2002 | Wingate | |
| 6,382,431 B1 | 5/2002 | Burke | |
| 6,430,467 B1 | 8/2002 | D Amelio | |
| 6,443,317 B1 | 9/2002 | Brozak, Jr. | |
| 6,464,089 B1 | 10/2002 | Rankin, VI | |
| 6,484,891 B2 | 11/2002 | Burke | |
| 6,502,012 B1 | 12/2002 | Nelson | |
| 6,527,565 B1 | 3/2003 | Johns | |
| 6,539,280 B1 | 3/2003 | Valiulis | |
| 6,550,269 B2 | 4/2003 | Rudick | |
| 6,558,017 B1 | 5/2003 | Saraiji | |
| 6,561,617 B2 | 5/2003 | Silverbrook | |
| 6,599,145 B2 | 7/2003 | Singh | |
| 6,622,874 B1 | 9/2003 | Hawkinson | |
| 6,671,578 B1 | 12/2003 | D Amelio | |
| 6,684,126 B2 | 1/2004 | Omura | |
| 6,735,498 B2 | 5/2004 | Hertz | |
| 6,749,207 B2 | 6/2004 | Nadeau | |
| D493,009 S | 7/2004 | Ken | |
| 6,772,888 B2 | 8/2004 | Burke | |
| 6,808,407 B1 | 10/2004 | Cannon | |
| 6,827,463 B2 | 12/2004 | Chuang | |
| 6,827,465 B2 | 12/2004 | Shemitz | |
| 6,859,677 B2 | 2/2005 | Mitterholzer | |
| 6,886,699 B2 | 5/2005 | Johnson | |
| 6,918,679 B2 | 7/2005 | Wu | |
| D521,286 S | 5/2006 | Colmenares | |
| 7,036,947 B2 | 5/2006 | Chuang | |
| 7,056,007 B2 | 6/2006 | Chiu | |
| 7,066,342 B2 | 6/2006 | Baechle | |
| 7,111,735 B2 | 9/2006 | Lowry | |
| 7,121,675 B2 | 10/2006 | Ter-Hovhannisian | |

(56) References Cited

U.S. PATENT DOCUMENTS

| | | |
|---|---|---|
| 7,137,517 B2 | 11/2006 | Lowry |
| 7,163,305 B2 | 1/2007 | Bienick |
| 7,175,034 B2 | 2/2007 | Nook |
| 7,184,857 B1 | 2/2007 | Hertz |
| 7,233,241 B2 | 6/2007 | Overhultz |
| 7,286,696 B2 | 10/2007 | Erickson |
| 7,289,656 B2 | 10/2007 | Engelbart |
| 7,293,663 B2 | 11/2007 | Lavery |
| 7,347,335 B2 | 3/2008 | Rankin, VI |
| 7,367,685 B2 | 5/2008 | Moll |
| 7,419,062 B2 | 9/2008 | Mason |
| 7,428,327 B2 | 9/2008 | Erickson |
| 7,434,951 B2 | 10/2008 | Bienick |
| 7,463,368 B2 | 12/2008 | Morden |
| 7,477,780 B2 | 1/2009 | Boncyk |
| 7,513,637 B2 | 4/2009 | Kelly |
| 7,529,597 B1 | 5/2009 | Hertz |
| 7,535,337 B2 | 5/2009 | Overhultz |
| 7,545,517 B2 | 6/2009 | Rueb |
| 7,551,765 B2 | 6/2009 | Thomas |
| 7,574,822 B1 | 8/2009 | Moore |
| 7,597,448 B1 | 10/2009 | Zarian |
| 7,597,462 B2 | 10/2009 | Misof |
| 7,600,887 B2 | 10/2009 | Sherman |
| 7,614,350 B2 | 11/2009 | Tuttle |
| 7,614,761 B2 | 11/2009 | Tanaka |
| 7,641,072 B1 | 1/2010 | Vlastakis |
| 7,664,305 B2 | 2/2010 | Erickson |
| 7,681,744 B2 | 3/2010 | Johnson |
| 7,689,460 B2 | 3/2010 | Natori |
| 7,693,757 B2 | 4/2010 | Zimmerman |
| 7,703,614 B2 | 4/2010 | Schneider |
| 7,726,831 B2 | 6/2010 | Shibusawa |
| 7,758,233 B2 | 7/2010 | Chang |
| 7,766,502 B2 | 8/2010 | Tress |
| 7,792,711 B2 | 9/2010 | Swafford |
| 7,794,132 B2 | 9/2010 | Cunius |
| 7,806,543 B2 | 10/2010 | Swofford |
| 7,823,734 B2 | 11/2010 | Hardy |
| 7,824,055 B2 | 11/2010 | Sherman |
| 7,824,056 B2 | 11/2010 | Madireddi |
| 7,824,057 B2 | 11/2010 | Shibusawa |
| 7,854,334 B2 | 12/2010 | Nagel |
| 7,871,176 B2 | 1/2011 | Kelly |
| 7,909,183 B2 | 3/2011 | Oh |
| 7,929,750 B2 | 4/2011 | Erickson |
| 7,940,181 B2 | 5/2011 | Ramachandra |
| 7,949,568 B2 | 5/2011 | Fano |
| 7,950,817 B2 | 5/2011 | Zulim |
| 7,954,979 B2 | 6/2011 | Sommers |
| 7,976,181 B2 | 7/2011 | Kelly |
| 8,002,181 B2 | 8/2011 | Ulrich |
| 8,002,441 B2 | 8/2011 | Barkdoll |
| 8,009,864 B2 | 8/2011 | Linaker |
| 8,047,657 B2 | 11/2011 | Ikeda |
| 8,066,398 B2 | 11/2011 | Hartman |
| 8,068,659 B2 | 11/2011 | Engelbart |
| 8,070,309 B2 | 12/2011 | Otsuki |
| 8,075,160 B1 | 12/2011 | Zarian |
| 8,083,078 B2 | 12/2011 | Omura |
| 8,113,678 B2 | 2/2012 | Babcock |
| 8,118,164 B2 | 2/2012 | Brown |
| 8,131,055 B2 | 3/2012 | Clarke |
| 8,136,956 B2 | 3/2012 | Oketani |
| 8,142,047 B2 | 3/2012 | Acampora |
| 8,164,274 B2 | 4/2012 | Pas |
| 8,172,096 B2 | 5/2012 | Van De Steen |
| 8,177,404 B2 | 5/2012 | Weng |
| 8,189,855 B2 | 5/2012 | Opalach |
| 8,190,289 B2 | 5/2012 | Lockwood |
| 8,190,497 B2 | 5/2012 | O'Dell |
| 8,210,367 B2 | 7/2012 | Nagel |
| 8,215,795 B2 | 7/2012 | Pichel |
| 8,224,720 B2 | 7/2012 | Cohen |
| 8,260,456 B2 | 9/2012 | Siegel |
| 8,292,095 B2 | 10/2012 | Howlett |
| 8,319,607 B2 | 11/2012 | Grimlund |
| 8,353,425 B2 | 1/2013 | Lockwood |
| 8,386,075 B2 | 2/2013 | Lockwood |
| 8,413,826 B2 | 4/2013 | Schneider |
| 8,413,843 B2 | 4/2013 | Vardaro |
| 8,419,205 B1 | 4/2013 | Schmuckle |
| 8,429,004 B2 | 4/2013 | Hamilton |
| 8,433,432 B2 | 4/2013 | Matsushita |
| 8,443,988 B2 | 5/2013 | Niederhuefner |
| 8,448,815 B2 | 5/2013 | Sholl |
| 8,453,851 B2 | 6/2013 | Ciesick |
| 8,490,424 B2 | 7/2013 | Roche |
| 8,506,109 B2 | 8/2013 | Stukenberg |
| 8,545,045 B2 | 10/2013 | Tress |
| 8,562,167 B1 | 10/2013 | Meier |
| 8,581,738 B2 | 11/2013 | Maggiore |
| 8,602,230 B2 | 12/2013 | Bergdoll |
| 8,607,997 B2 | 12/2013 | Bergdoll |
| 8,616,757 B2 | 12/2013 | Leadford |
| 8,630,924 B2 | 1/2014 | Groenevelt |
| 8,631,956 B2 | 1/2014 | Dowd |
| 8,646,935 B2 | 2/2014 | Karan |
| 8,651,296 B2 | 2/2014 | Beaty |
| 8,676,377 B2 | 3/2014 | Siegel |
| 8,678,232 B2 | 3/2014 | Mockus |
| 8,684,268 B2 | 4/2014 | Pas |
| 8,695,878 B2 | 4/2014 | Burnside |
| 8,720,702 B2 | 5/2014 | Nagel |
| 8,746,916 B2 | 6/2014 | Oketani |
| 8,800,811 B2 | 8/2014 | Sherretts |
| 8,812,378 B2 | 8/2014 | Swafford |
| 8,814,399 B2 | 8/2014 | Osawa |
| 8,820,545 B2 | 9/2014 | Kologe |
| 8,823,355 B2 | 9/2014 | Hachmann |
| 8,823,521 B2 | 9/2014 | Overhultz |
| 8,858,013 B2 | 10/2014 | Attey |
| 8,864,334 B2 | 10/2014 | Swafford, Jr. |
| 8,908,903 B2 | 12/2014 | Deng |
| 8,910,801 B2 | 12/2014 | Johnson |
| 8,925,745 B2 | 1/2015 | Theisen |
| 8,938,396 B2 | 1/2015 | Swafford |
| 8,939,779 B1 | 1/2015 | Lindblom |
| 8,941,495 B2 | 1/2015 | Wiese |
| 8,941,645 B2 | 1/2015 | Grimaud |
| 8,972,291 B2 | 3/2015 | Rimnac |
| 8,978,901 B2 | 3/2015 | Hogeback |
| 8,978,903 B2 | 3/2015 | Hardy |
| 8,978,904 B2 | 3/2015 | Hardy |
| 8,979,296 B2 | 3/2015 | Wiemer |
| 8,985,352 B2 | 3/2015 | Bergdoll |
| 8,998,005 B2 | 4/2015 | Hardy |
| 9,016,484 B2 | 4/2015 | Kologe |
| 9,022,637 B2 | 5/2015 | Meyer |
| 9,033,239 B2 | 5/2015 | Winkel |
| 9,038,833 B2 | 5/2015 | Ciesick |
| 9,044,089 B1 | 6/2015 | Sandhu |
| 9,044,105 B2 | 6/2015 | McClaughry |
| 9,052,994 B2 | 6/2015 | Lockwood |
| 9,057,513 B2 | 6/2015 | Lindblom |
| 9,070,261 B2 | 6/2015 | Hardy |
| 9,072,394 B2 | 7/2015 | Hardy |
| 9,091,587 B2 | 7/2015 | Kawamura |
| 9,101,230 B2 | 8/2015 | Sosso |
| 9,107,497 B1 | 8/2015 | Al-Habsi |
| 9,107,515 B2 | 8/2015 | Hardy |
| 9,119,488 B2 | 9/2015 | Lockwood |
| 9,121,583 B2 | 9/2015 | Takeuchi |
| 9,129,494 B2 | 9/2015 | Valiulis |
| 9,131,787 B2 | 9/2015 | Berglund |
| 9,138,075 B2 | 9/2015 | Hardy |
| 9,138,076 B2 | 9/2015 | Hardy |
| 9,149,130 B2 | 10/2015 | Yuen |
| 9,149,132 B2 | 10/2015 | Hardy |
| 9,167,914 B2 | 10/2015 | Rankin, VI |
| 9,179,788 B2 | 11/2015 | Hardy |
| 9,185,999 B2 | 11/2015 | Hardy |
| 9,188,291 B2 | 11/2015 | Cassidy |
| 9,204,736 B2 | 12/2015 | Lindblom |

(56) References Cited

U.S. PATENT DOCUMENTS

| | | |
|---|---|---|
| 9,222,645 B2 | 12/2015 | Breslow |
| 9,228,735 B2 | 1/2016 | Liu |
| 9,239,136 B1 | 1/2016 | Petersen |
| 9,254,049 B2 | 2/2016 | Nagel |
| 9,279,544 B1 | 3/2016 | Dankelmann |
| 9,364,100 B2 | 6/2016 | Browning |
| 9,384,684 B2 | 7/2016 | Theisen |
| 9,404,645 B1 | 8/2016 | Feng |
| 9,424,446 B2 | 8/2016 | Baarman |
| 9,456,704 B2 | 10/2016 | Bhargava |
| 9,483,896 B2 | 11/2016 | Lockwood |
| 9,509,110 B1 | 11/2016 | Buck |
| 9,691,308 B2 | 6/2017 | Meyer |
| 9,775,447 B2 | 10/2017 | Wiemer |
| 9,829,178 B2 | 11/2017 | Breslow |
| 9,986,852 B2 | 6/2018 | Chenoweth |
| 2002/0072323 A1 | 6/2002 | Hakemann |
| 2002/0146282 A1 | 10/2002 | Wilkes |
| 2002/0147597 A1 | 10/2002 | Connors |
| 2002/0171335 A1 | 11/2002 | Held |
| 2004/0050811 A1 | 3/2004 | Leahy |
| 2004/0073334 A1 | 4/2004 | Terranova |
| 2004/0117243 A1 | 6/2004 | Chepil |
| 2004/0208372 A1 | 10/2004 | Boncyk |
| 2005/0040123 A1 | 2/2005 | Ali |
| 2005/0171854 A1 | 8/2005 | Lyon |
| 2005/0173605 A1 | 8/2005 | Villeneuve |
| 2005/0254262 A1 | 11/2005 | Chiu |
| 2005/0279722 A1 | 12/2005 | Ali |
| 2006/0067089 A1 | 3/2006 | Hocquard |
| 2006/0071774 A1 | 4/2006 | Brown |
| 2006/0097875 A1 | 5/2006 | Ott |
| 2006/0207778 A1 | 9/2006 | Walter |
| 2007/0022644 A1 | 2/2007 | Lynch |
| 2007/0042614 A1 | 2/2007 | Marmaropoulos |
| 2007/0273513 A1 | 11/2007 | White |
| 2007/0290585 A1 | 12/2007 | Moeller |
| 2008/0055914 A1 | 3/2008 | O'Rourke |
| 2008/0077510 A1 | 3/2008 | Dielemans |
| 2008/0083353 A1 | 4/2008 | Tuttle |
| 2008/0121146 A1 | 5/2008 | Burns |
| 2008/0144934 A1 | 6/2008 | Raynaud |
| 2008/0151535 A1 | 6/2008 | De Castris |
| 2008/0277361 A1 | 11/2008 | Primiano |
| 2008/0278932 A1 | 11/2008 | Tress |
| 2008/0306787 A1 | 12/2008 | Hamilton |
| 2009/0037244 A1 | 2/2009 | Pemberton |
| 2009/0039040 A1 | 2/2009 | Johnson |
| 2009/0223916 A1 | 9/2009 | Kahl |
| 2009/0279295 A1 | 11/2009 | Van Der Poel |
| 2010/0087953 A1 | 4/2010 | Garson |
| 2010/0089846 A1 | 4/2010 | Navarro Ruiz |
| 2010/0102685 A1 | 4/2010 | Ward |
| 2010/0103701 A1 | 4/2010 | Bartlett |
| 2010/0195317 A1 | 8/2010 | Oketani |
| 2010/0201522 A1 | 8/2010 | White |
| 2011/0044030 A1 | 2/2011 | Pichel |
| 2011/0203148 A1 | 8/2011 | Li |
| 2011/0203496 A1 | 8/2011 | Garneau |
| 2011/0204009 A1 | 8/2011 | Karan |
| 2011/0215060 A1 | 9/2011 | Niederhuefner |
| 2011/0218889 A1 | 9/2011 | Westberg |
| 2011/0273867 A1 | 11/2011 | Horst |
| 2011/0304316 A1 | 12/2011 | Hachmann |
| 2012/0230018 A1 | 9/2012 | Wiemer |
| 2012/0233041 A1 | 9/2012 | O'Dell |
| 2012/0274189 A1 | 11/2012 | Attey |
| 2012/0279934 A1 | 11/2012 | Thomas |
| 2012/0281095 A1 | 11/2012 | Trenciansky |
| 2012/0308969 A1 | 12/2012 | Rataul |
| 2012/0310398 A1 | 12/2012 | Rataul |
| 2012/0310570 A1 | 12/2012 | Pyne |
| 2013/0024023 A1 | 1/2013 | Siegel |
| 2013/0107498 A1 | 5/2013 | McClaughry |
| 2013/0107501 A1 | 5/2013 | Ewald |
| 2013/0144416 A1 | 6/2013 | Rataul |
| 2013/0155815 A1 | 6/2013 | Wulff |
| 2013/0176398 A1 | 7/2013 | Bonner |
| 2013/0226742 A1 | 8/2013 | Johnson |
| 2013/0229789 A1 | 9/2013 | Yoshida |
| 2013/0238516 A1 | 9/2013 | Moock |
| 2013/0286651 A1 | 10/2013 | Takeuchi |
| 2013/0299439 A1 | 11/2013 | Sid |
| 2013/0337668 A1 | 12/2013 | Ernest |
| 2013/0341292 A1 | 12/2013 | Johnson |
| 2013/0343014 A1 | 12/2013 | Browning |
| 2014/0006229 A1 | 1/2014 | Birch |
| 2014/0008382 A1 | 1/2014 | Christianson |
| 2014/0009372 A1 | 1/2014 | Fernando |
| 2014/0032379 A1 | 1/2014 | Schuetz |
| 2014/0055978 A1 | 2/2014 | Gantz |
| 2014/0055987 A1 | 2/2014 | Lindblom |
| 2014/0057604 A1 | 2/2014 | Kolanowski |
| 2014/0104826 A1 | 4/2014 | Bergdoll |
| 2014/0110481 A1 | 4/2014 | Burnside |
| 2014/0129395 A1 | 5/2014 | Groenovelt |
| 2014/0153279 A1 | 6/2014 | Weyer |
| 2014/0175034 A1 | 6/2014 | Hardy |
| 2014/0201040 A1 | 7/2014 | Birch |
| 2014/0201041 A1 | 7/2014 | Meyer |
| 2014/0201042 A1 | 7/2014 | Meyer |
| 2014/0207606 A1 | 7/2014 | Harrison |
| 2014/0224875 A1 | 8/2014 | Slesinger |
| 2014/0254136 A1 | 9/2014 | Oraw |
| 2014/0291346 A1 | 10/2014 | Mockus |
| 2014/0299620 A1 | 10/2014 | Swafford |
| 2014/0305889 A1 | 10/2014 | Vogler |
| 2014/0316916 A1 | 10/2014 | Hay |
| 2014/0324642 A1 | 10/2014 | Winkel |
| 2014/0333541 A1 | 11/2014 | Lee |
| 2014/0344118 A1 | 11/2014 | Parpia |
| 2014/0353265 A1 | 12/2014 | Rankin, VI |
| 2015/0024615 A1 | 1/2015 | Lindblom |
| 2015/0026020 A1 | 1/2015 | Overhultz |
| 2015/0036326 A1 | 2/2015 | Maciulewicz |
| 2015/0046299 A1 | 2/2015 | Yan |
| 2015/0053237 A1 | 2/2015 | Lee |
| 2015/0055328 A1 | 2/2015 | Irii |
| 2015/0070928 A1 | 3/2015 | Rau |
| 2015/0073947 A1 | 3/2015 | Higgins |
| 2015/0076093 A1 | 3/2015 | Theisen |
| 2015/0079823 A1 | 3/2015 | Lindblom |
| 2015/0088701 A1 | 3/2015 | Desmarais |
| 2015/0088703 A1 | 3/2015 | Yan |
| 2015/0123973 A1 | 5/2015 | Larsen |
| 2015/0125835 A1 | 5/2015 | Wittich |
| 2015/0128398 A1 | 5/2015 | Benlevi |
| 2015/0134403 A1 | 5/2015 | Schwartz |
| 2015/0160651 A1 | 6/2015 | Tateno |
| 2015/0173529 A1 | 6/2015 | Hester-Redmond |
| 2015/0193723 A1 | 7/2015 | Carbonell |
| 2015/0193759 A1 | 7/2015 | Fukuda |
| 2015/0235502 A1 | 8/2015 | Lockwood |
| 2015/0241034 A1 | 8/2015 | Dankelmann |
| 2015/0241035 A1 | 8/2015 | Dankelmann |
| 2015/0289680 A1 | 10/2015 | Sosso |
| 2016/0061429 A1 | 3/2016 | Waalkes |
| 2016/0091177 A1 | 3/2016 | Houle |
| 2016/0097516 A1 | 4/2016 | Howard |
| 2016/0104985 A1 | 4/2016 | Ewing |
| 2016/0157635 A1 | 6/2016 | Hardy |
| 2016/0174733 A1 | 6/2016 | Cinici |
| 2016/0209941 A1 | 7/2016 | Hadas |
| 2016/0213168 A1 | 7/2016 | Nuttall |
| 2016/0313051 A1 | 10/2016 | Alt |
| 2018/0047243 A1 | 2/2018 | Swafford, Jr. |
| 2018/0107973 A1 | 4/2018 | Overhultz |

FOREIGN PATENT DOCUMENTS

| | | |
|---|---|---|
| CN | 101574214 | 11/2009 |
| CN | 202681155 U | 1/2013 |
| CN | 204862262 | 12/2015 |
| CN | 205560499 U | 9/2016 |

(56) References Cited

FOREIGN PATENT DOCUMENTS

| | | |
|---|---|---|
| DE | 19531866 | 2/1997 |
| DE | 20111800 | 10/2001 |
| DE | 10153495 A1 | 5/2003 |
| DE | 102010050500 | 5/2012 |
| DE | 202014001867 U1 | 3/2014 |
| EP | 268209 A2 | 5/1988 |
| EP | 0441354 A1 | 8/1991 |
| EP | 0683998 | 11/1995 |
| EP | 1057164 A1 | 12/2000 |
| EP | 1541064 A1 | 6/2005 |
| EP | 1579789 A1 | 9/2005 |
| EP | 2220965 | 8/2010 |
| EP | 2292120 | 3/2011 |
| EP | 2732729 A1 | 5/2014 |
| GB | 2291788 | 2/1996 |
| GB | 2297896 | 8/1996 |
| GB | 2325148 | 11/1998 |
| GB | 2359405 | 8/2001 |
| GB | 2390214 A | 12/2003 |
| RU | 2014112705 | 10/2015 |
| TW | 201513811 A | 4/2015 |
| WO | 1995016375 | 6/1995 |
| WO | 9708667 | 3/1997 |
| WO | 9908950 | 2/1999 |
| WO | 2000024297 A1 | 5/2000 |
| WO | 2003060839 | 7/2003 |
| WO | 03079852 A1 | 10/2003 |
| WO | 2005023060 A1 | 3/2005 |
| WO | 2006023954 | 3/2006 |
| WO | 2006067396 | 6/2006 |
| WO | 2007140161 | 12/2007 |
| WO | 2007146740 | 12/2007 |
| WO | 2008152973 A1 | 12/2008 |
| WO | 2010024507 A1 | 3/2010 |
| WO | 2011062727 | 11/2011 |
| WO | 2011159995 | 12/2011 |
| WO | 2012009822 | 1/2012 |
| WO | 2012015361 A1 | 2/2012 |
| WO | 2012018774 | 2/2012 |
| WO | 2012074781 | 6/2012 |
| WO | 2012165190 | 12/2012 |
| WO | 2012165191 A1 | 12/2012 |
| WO | 2013192487 | 12/2013 |
| WO | 2013192491 | 12/2013 |
| WO | 2014137620 | 9/2014 |
| WO | 2014173629 A1 | 10/2014 |
| WO | 2014200998 | 12/2014 |
| WO | 2015061429 | 4/2015 |
| WO | 2015061437 | 4/2015 |
| WO | 2017074891 | 5/2017 |

OTHER PUBLICATIONS

Intellectual Property Office, British Search Report under Section 17(5) for GB1414037.0, dated Dec. 1, 2014 (pp. 3).
Intelectual Property Office, British Examination Report under Section 18(3) Corresponding to Application No. GB1414037.0, dated Apr. 13, 2017, 6 pp.
Fixtures Close Up, Pusher Paddle Message Rant, Jul. 28, 2010, 14 pp.
Patent Cooperation Treaty, International Searching Authority, Notification of Transmittal of the International Search Report and the Written Opinion of the International Searching Authority, or the Declaration issued in International Application No. PCT/US2017/057225, dated Apr. 12, 2018, 9 pp.
International Search Report issued for PCT/US12/28250; dated Mar. 8, 2012, 3 pp.
International Search Report issued in International Application No. PCT/ US12/28250, dated Jul. 5, 2012, 1 p.
Patent Cooperation Treaty, International Searching Authority, Notification of Transmittal of the International Search Report and the Written Opinion of the International Searching Authority or the Declaration issued in International Application No. PCT/US2017/013973, dated May 25, 2017, 13 pp.
POS Tuning UDO Vobhenrich GMBH & Co. KG, POS-T Tuning LED Lighting of Trays, Sep. 9, 2010, 20 pp.
Streater, Streatlite Connector specifications page, Jun. 8, 2012, 1 p.
Trinity LLC, Trinity Credentials Presentation, Jul. 2013, 10 pp. (cover & title pp., 3, 13-18, 32).
DCI-Artform, Grocery.dcim.com/Products/SpaceGrid-I.aspx, "SpaceGrid I Trays-Enhance Frozen Food Appeal and Profitability", 2014, 3 pp.
DCI-Artform, Grocery.dcim.com/Products/SpaceGrid-II.aspx, "SpaceGrid II Trays-Maximize Profitability in Key Store Perimeter Categories", 2014, 2 pp.
Phoenix Displays LLC, Phoenixdisplays.com/displays.html, "Phoenix Displays LLC—Manufacturer of Forward-Facing Product Displays", 2014, 3 pp.
Trion Industries, Inc., Triononline.com/product/wonderfar-merchandising-system/, "Trion Wonderbar Merchandising System", 2017, 2 pp.

* cited by examiner

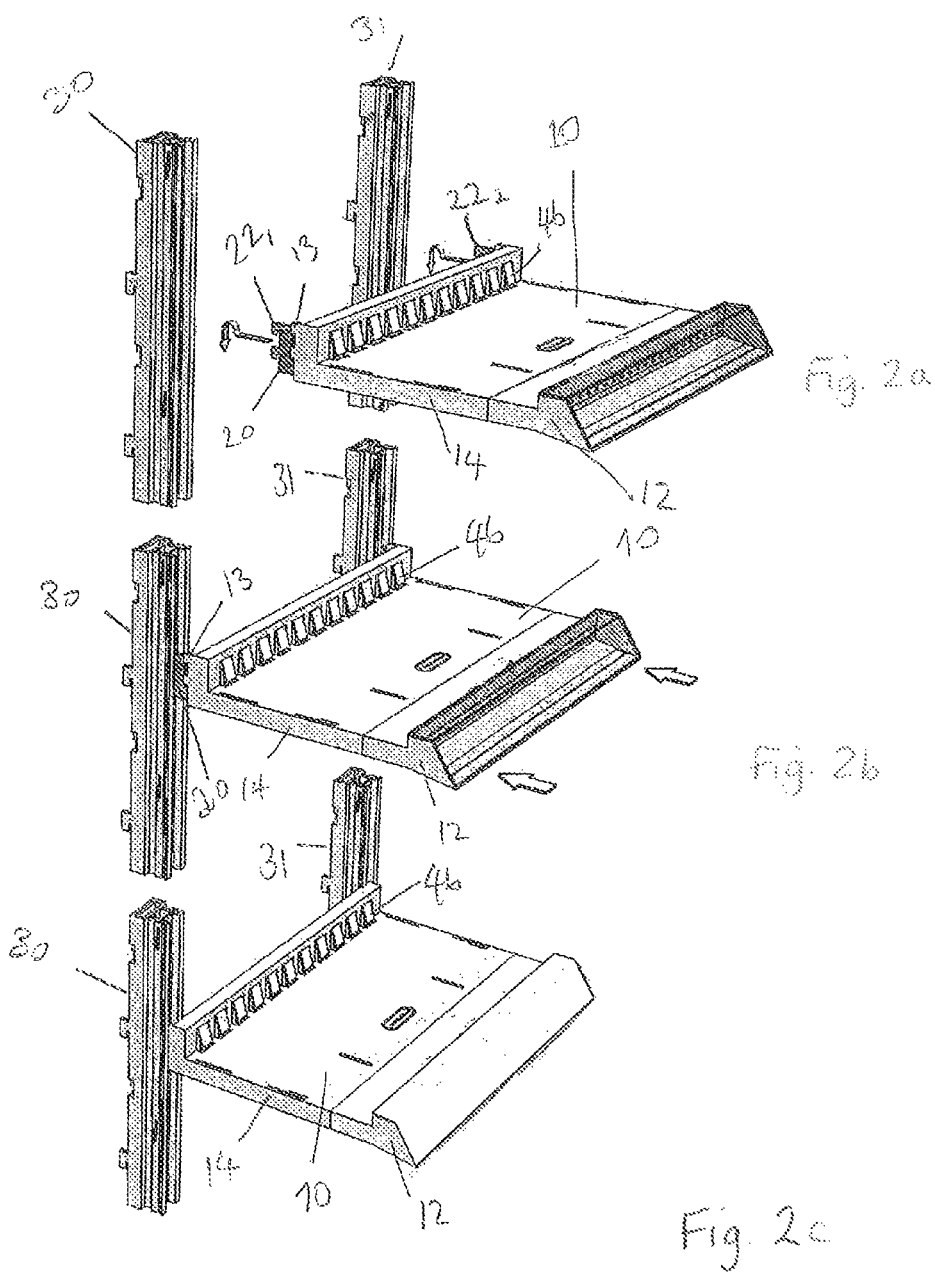

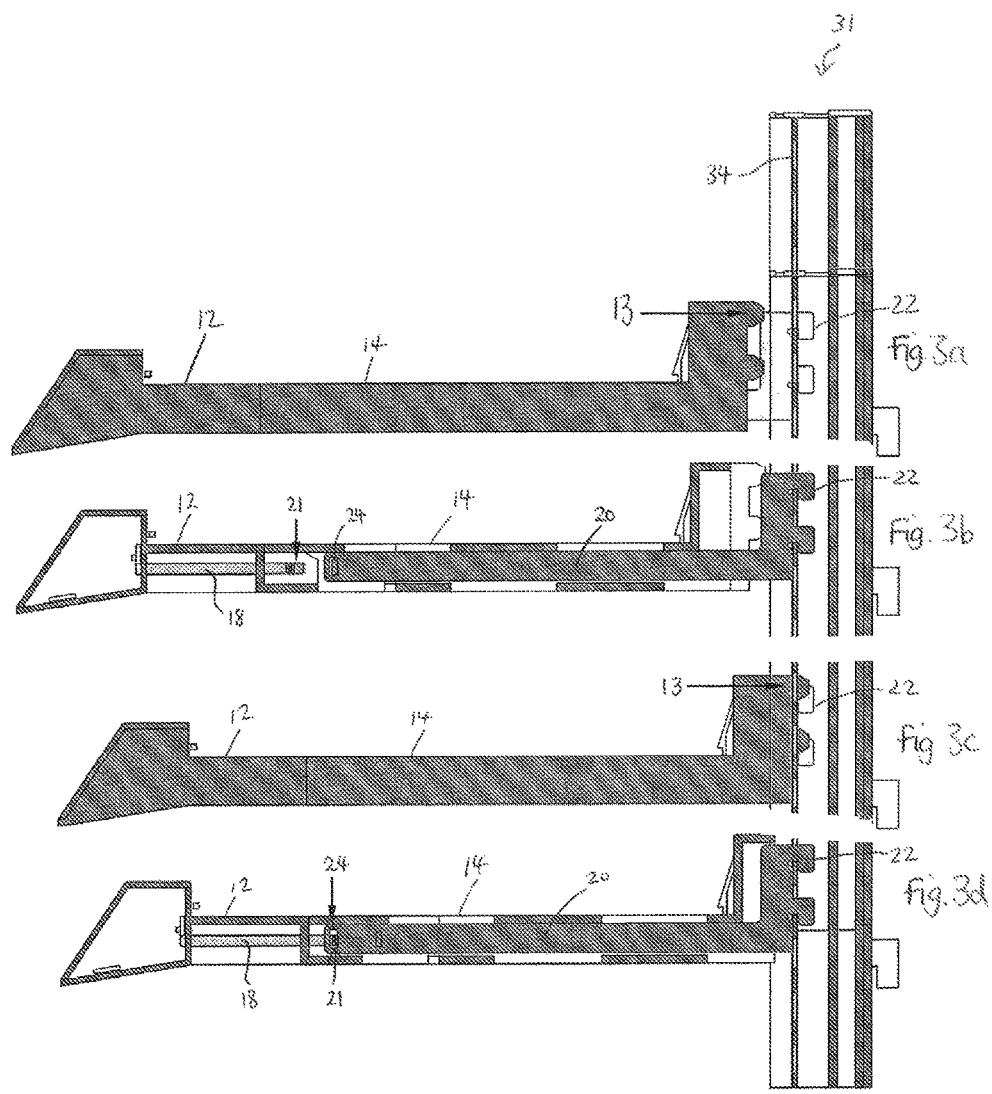

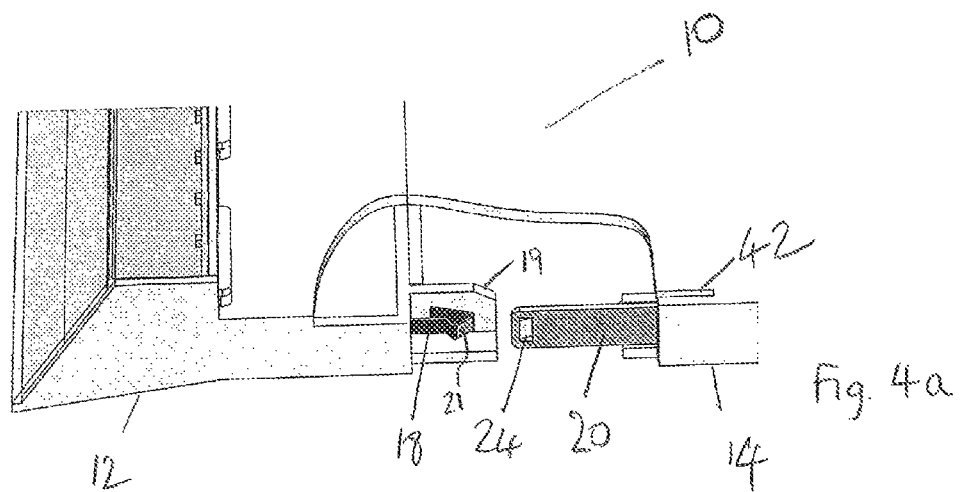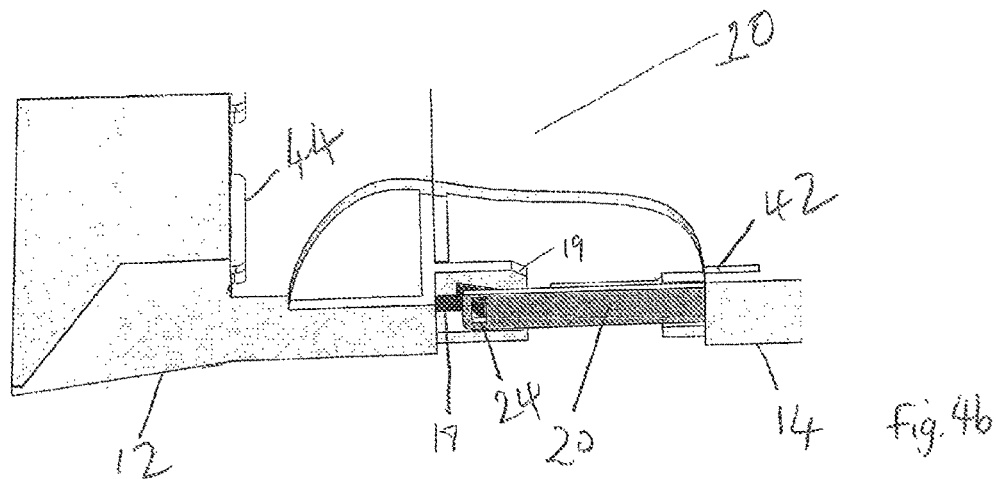

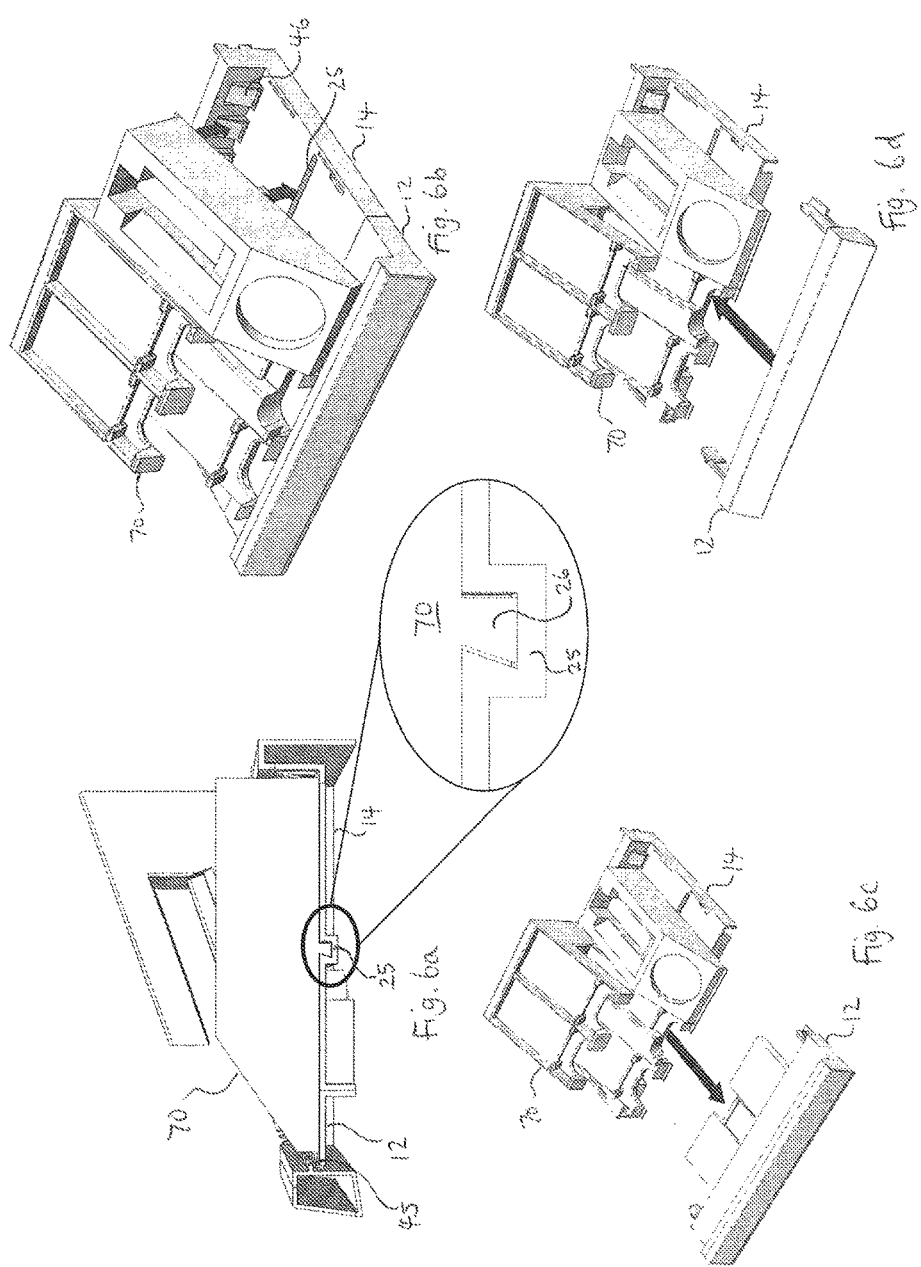

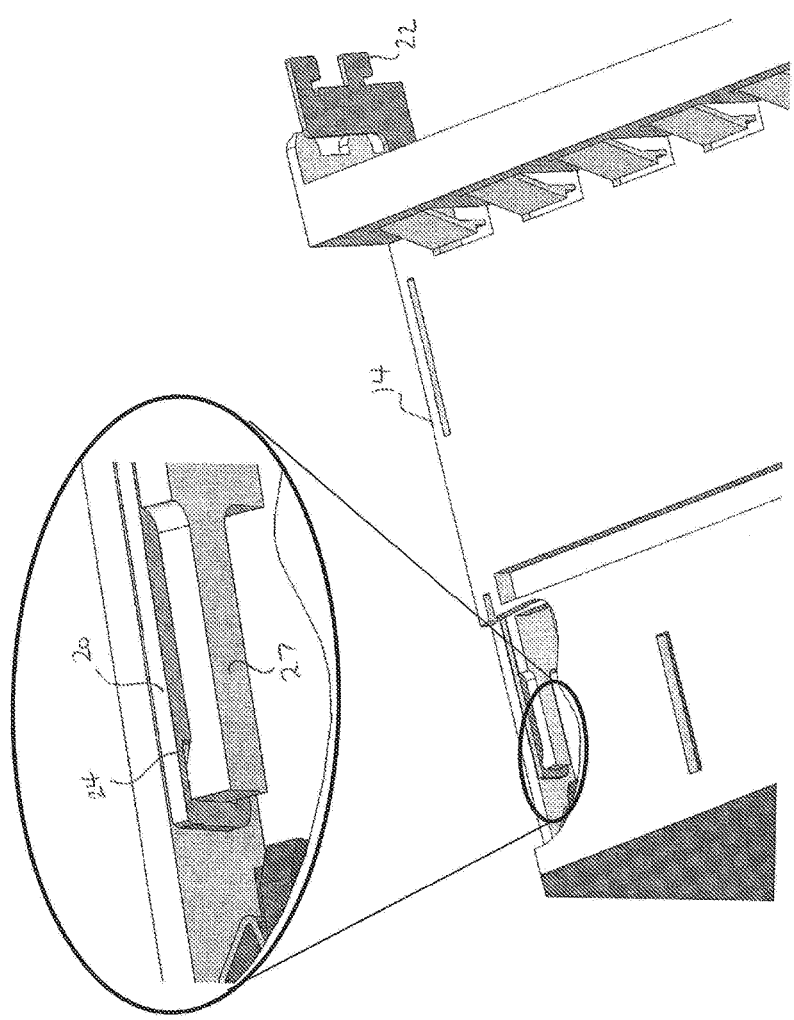

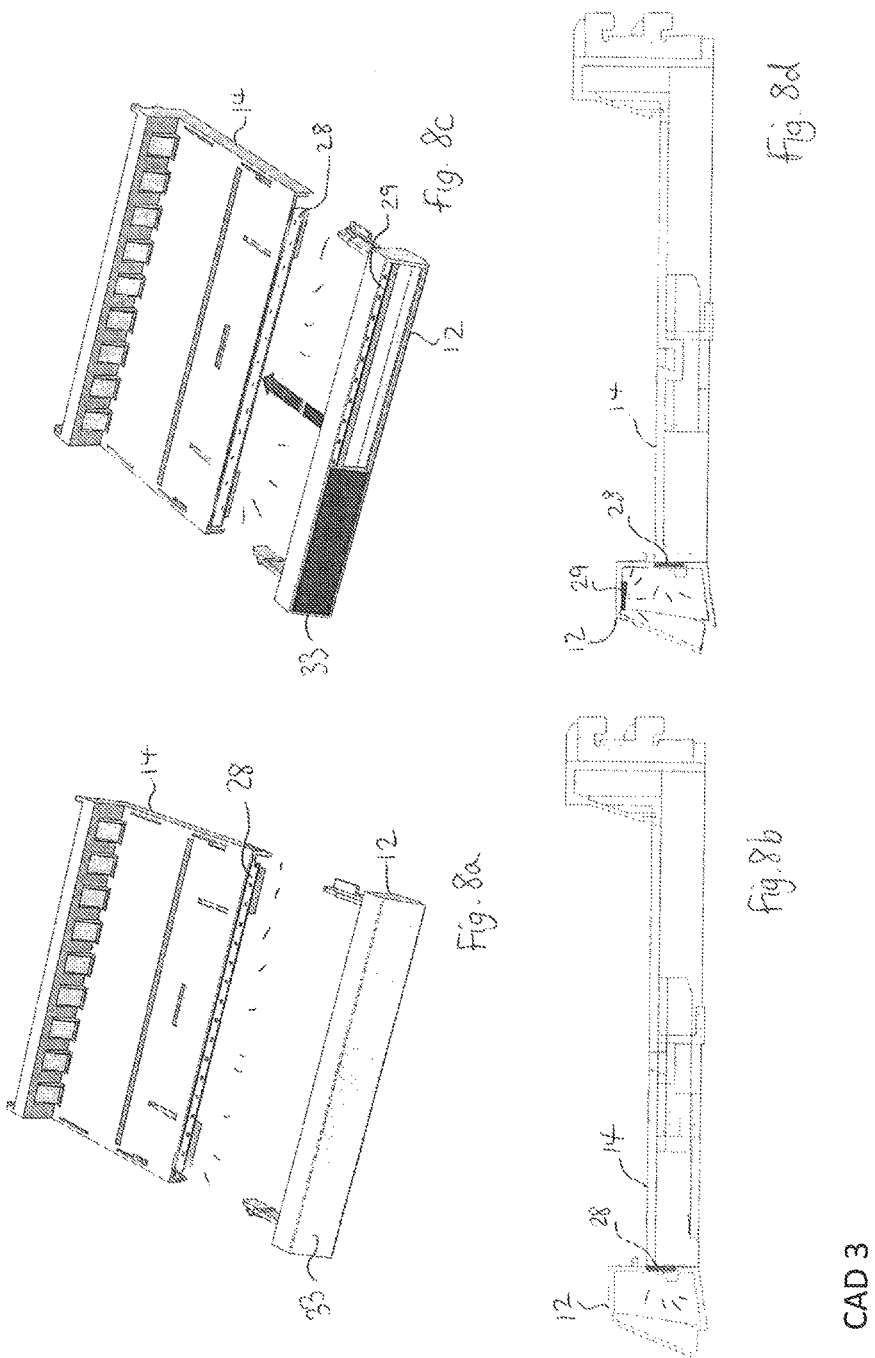

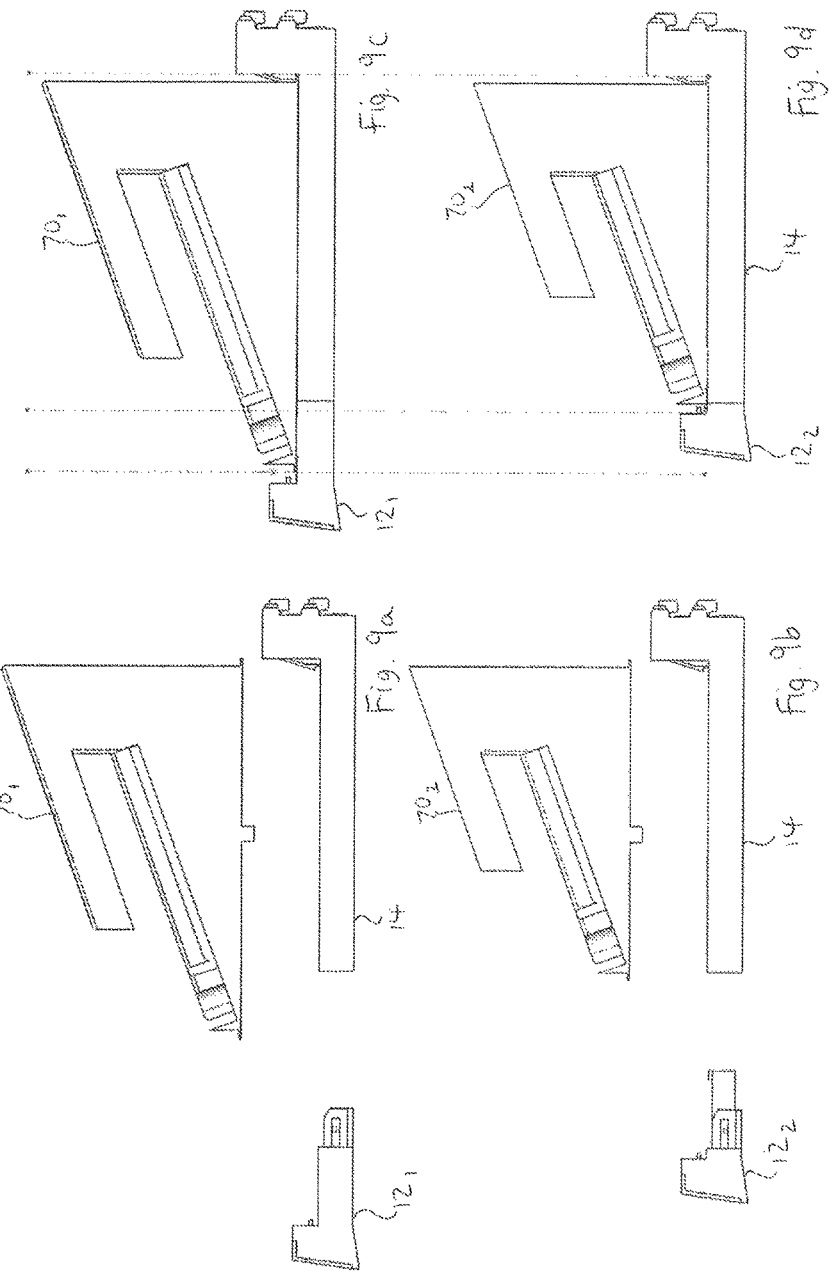

PRODUCT DISPLAY SHELF, SYSTEM AND METHOD

CROSS-REFERENCE TO RELATED APPLICATIONS

This application is a U.S. national phase application filed under 35 U.S.C. § 371 of International Application PCT/GB2015/052296, filed Aug. 7, 2015, designating the United States, and claims the benefit of British Application No. GB1414037.0, filed Aug. 7, 2014, the entire disclosures of which are incorporated herein by reference.

There is disclosed a product display shelf, system and method for displaying products. In particular, but not exclusively, there is disclosed a convenient and safe means for providing a display for consumer goods to be sold in a retail establishment, for example.

BACKGROUND

Many different types of product display shelves are known. Typically these consist of shelving units in the form of product trays supported in some fashion and located at various positions in a shop or other retail establishment. Products are hung from the product trays or supported on an upper surface of a platform of the product trays and customers wishing to purchase the products can remove these from the display.

Displays are also known which include one or more light sources to illuminate parts, or all, of the display matrix. It is known that during an initial installation phase when the display is constructed, the provision of lighting can be an onerous task requiring a user to access parts of the display which may be difficult to reach.

This is very common in the health and beauty arena. In addition there is a situation where multiple brands within a store have to follow certain guidelines with the functionality and operation of display equipment in store. This can lead to a situation where there are common functions and features inherent in a display across multiple brands. To the consumer there is clear point of difference across the brands, achieved by specific design of the front of the shelves and/or features around the shopable area. This also includes graphics and illumination.

WO2006/067396 discloses an apparatus and method for displaying retail products. The apparatus includes a number of product display trays connected to an upright spur. Each tray includes an electrical connection to electrically connect the tray to the spur.

In a world in which consumer products and branding are frequently being renewed, it would be useful to have a product display system that offers users a more convenient way of changing the visual appearance of the display shelf with minimum effort and cost.

BRIEF SUMMARY OF THE DISCLOSURE

According to a first aspect, there is disclosed a front shelf portion for releasable attachment to a back shelf portion to form a product display shelf, the front shelf portion comprising:
  a body portion;
  a connecting element for releasably attaching the body portion to a back shelf portion; and
  a display panel connected to or integral with the body portion, suitable for displaying information to a user.

According to a second aspect, there is disclosed a front shelf portion for releasable attachment to a back shelf portion to form a product display shelf, the front shelf portion comprising:
  a body portion;
  a connecting element for releasably attaching the body portion to a back shelf portion; and
  a display panel connected to or integral with the body portion, suitable for displaying information to a user.

According to a third aspect there is disclosed a computer readable medium having a computer executable instructions adapted to cause a 3-D printer to print a shelf unit comprising a back shelf portion and a front shelf portion;
  wherein the back shelf portion comprises a first connecting element for releasably attaching the back shelf portion to an electrically powered support member, and the front shelf portion comprises a second connecting element for releasably attaching the front shelf portion to the back shelf portion.

Certain embodiments of the present invention provide the advantage that a product display system is provided that enables a user to easily vary the appearance and/or overall design of the display system without needing to completely dismantle the whole product display system. For example, the front shelf portion (only) may be removed from a product display system, the front shelf portion updated in some way, such as a change in visual appearance, and then the front shelf portion reconnected to the back shelf portion.

In addition, the function and/or capacity of the shelf may be varied. For example, the depth of the full shelf may be varied by having a number of interchangeable front shelf portions each having a different depth.

This user friendly system can reduce both expense and time in a retail environment because it is simple to operate and easily changeable.

The product display system may reduce the cost of product display installation in a retail environment because the user need only change the shelf front in order to vary the appearance, function, capacity and/or overall design of the display system, allowing the user the functionality to keep abreast of the changing trends of retail displays.

Certain embodiments of the present invention provide the advantage that a front shelf portion is provided that can be releasably attached to a back shelf portion to form a product display shelf. This provides the potential to more easily vary the appearance and design of the display shelf.

BRIEF DESCRIPTION OF THE DRAWINGS

Embodiments of the invention are further described hereinafter with reference to the accompanying drawings, in which:

FIGS. 2a, 2b and 2c illustrate the product display system in 3 positions;

FIG. 3a illustrates a side view of a product display system in an unlocked position;

FIG. 3b illustrates a cross-sectional view of the product display system in an unlocked position;

FIG. 3c illustrates a side view of the product display system in a locked position;

FIG. 3d illustrates a cross-sectional view of the product display system in a locked position;

FIGS. 4a and 4b respectively illustrate a side view of a support bracket in an unlocked position and a locked position;

FIG. 6a illustrates a side view of a shelf holding a product cassette;

FIG. 6b illustrates a perspective view of the shelf in FIG. 6a;

FIGS. 6c and 6d illustrate the front shelf portion being removed or reconnected to the shelf in FIGS. 6a and 6b;

FIG. 7 illustrates an example of a back shelf portion;

FIG. 8a illustrates an example of a front and back shelf portion;

FIG. 8b illustrates a side view of the shelf portions in FIG. 8a after connection;

FIG. 8c illustrates another example of a front and back shelf portion;

FIG. 8d illustrates a side view of the shelf portions in FIG. 8c after connection;

FIGS. 9a and 9c illustrate a shelf and product cassette in a disassembled and assembled state respectively;

FIGS. 9b and 9d illustrate another shelf and product cassette in a disassembled and assembled state respectively.

In the drawings like reference numerals refer to like parts.

DETAILED DESCRIPTION

Figure 1:
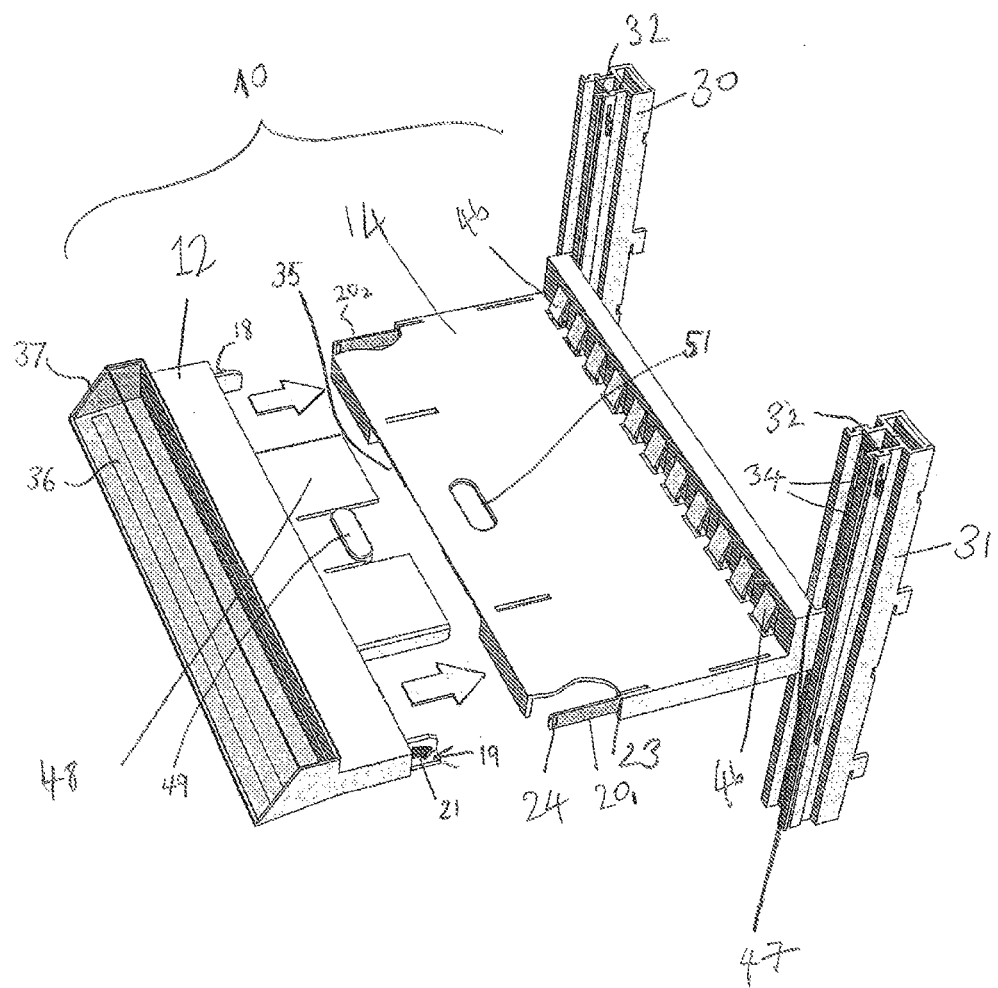
FIG. 1 illustrates a perspective view of a product display system, with a front shelf portion detached from a back shelf portion.

FIG. 1 shows a product display system having a shelf unit 10 in the form of a product tray (or platform). The shelf unit 10 includes a back shelf portion 14 and a front shelf portion 12. In this example both the front shelf portion and back shelf portion are formed mainly from fire retardant polycarbonate. However it will be appreciated that other materials may be used, e.g. polymers, plastics, composites, or other materials, or mixes thereof.

Together, the back shelf portion and front shelf portion form a shelf for supporting products to be displayed, for example retail items in a retail store. In use, the front shelf portion is brought towards the back shelf portion (as indicated by the arrows) until the shelf portions are connected to form a shelf.

It will be understood that a broad range of products may be supported by the shelves according to various embodiments. For example, retail products of the type purchased by shoppers in a supermarket or department store. The products may be supported on an upper surface of the shelf or may be hung below the shelf.

The back shelf portion 14 includes a connecting element, which in this example is conductive hooks 22 (see FIG. 2), for releasably attaching the back shelf portion 14 to elongate, electrically powered support rails 30, 31 (support members). In this example in which there are two support rails, the back shelf portion includes two conductive hooks $22_1$, $22_2$, located at the rear of the back shelf portion and approximately at the two side edges, so as to correspond with the spacing of the support rails. The hooks provide both mechanical attachment and electrical connectivity to the support rails 30, 31. The hooks are spaced to correspond with and slot into recesses 34 formed in the support rails 30, 31. The recesses provide access to an electric cable 32 within the rails 30, 31.

The support rails 30,31 are fixable to a wall, stand or other upright member. The electric cable 32 runs along the length of each support rail and is connected to a power source (not shown). The support rails have a number of recesses 34, such that there are numerous different height options for hooking the hooks 22 into.

Upon insertion of the hooks $22_1$, $22_2$ into the recesses 34, a rear surface 47 of the back shelf portion 14 abuts the support rails 30, 31. The rear surface and the hooks both provide mechanical stability of the back shelf portion 14 when hooked into the support rails 30, 31. The hooks 22 extend from a first end of a conductive bracket $20_1$, $20_2$. The brackets 20 each extend along a channel 23 in the back shelf portion 14. The channels 23 are provided along the two side edges of the back shelf portion. The brackets 20 are elongate members formed from plated mild steel in this case. This gives the brackets not only electrical conductivity but also mechanical strength. Of course other materials could be used, for example a metal plated with nickel, copper or zinc (which also provide anticorrosion properties).

Optionally the brackets 20 may form an interference fit in the channels 23.

Optionally the brackets 20 may include a clip 27 to prevent the back shelf portion being completely removed from the bracket, as shown in FIG. 7. The clip 27 is an extension of the back shelf portion 14 and may hook into the slot 24 (when the connector portion 18 is not hooked into the slot 24).

The front shelf portion 12 includes a connecting element for releasably attaching the front shelf portion 14 to the back shelf portion 12. The connecting element in this example is a protrusion 48 extending from the rear side of the front shelf portion towards the back shelf portion.

More specifically, the protrusion 48 includes two side portions and a central portion that is shorter than the side portions, and the central portion is resiliently biased such that a protruding button 49 can be inserted or released from a corresponding hole 51 in the back shelf portion 14. The ability to move the central portion, to be inserted or released from the hole 51, comes from the shape of the central portion as well as its material (in this case fire retardant polycarbonate).

The protrusion 48 functions so as to slot into a corresponding void area 35 in the underside of the back shelf portion when the front shelf portion is moved in the direction of the arrows, and thereby connect the front shelf portion with the back shelf portion. It will be appreciated that other designs of the protrusion are possible that will achieve this function.

The protrusion 48 in the front shelf portion 12 also acts as a cantilever to help the back shelf portion 14 support the weight of the front shelf portion 12 when they are connected.

As mentioned above, the back shelf portion 14 includes conductive brackets $20_1$, $20_2$ each having a hook 22 at one end thereof. At the other end of the conductive brackets $20_1$, $20_2$, there is a slot 24 for receiving a corresponding connection in the front shelf portion. This provides a further point of connection with the front shelf portion.

The front shelf portion 12 includes two connector portions 18, which are in some ways similar to the brackets 20. The connector portions 18 are also conductive, of phosphor bronze in this example, and each extend along a channel 19 in the front shelf portion. The channels 19 are provided along the two side edges of the front shelf portion.

An end of each connector portion 18 is folded so as to form a generally triangular shaped protrusion 21 facing laterally outwards (seen more clearly in FIG. 4a). The connector portions 18 are configured to engage with the slot 24 in the brackets 20 of the back shelf portion 14. The ends of the connector portions 18 are configured as a sprung element so that as the front shelf portion 12 is moved towards the back shelf portion 14, the protrusion 21 urges against the bracket 20 until the triangular protrusion 21 of the connector 18 locates the slot 24, and engages with the slot 24.

At the other end of the connector portions 18 is wiring (not shown), electrically connecting the connectors 18 with a strip of LED lights 36 in the front shelf portion so that the lights 36 can be powered.

The connector portions 18 provide an electrical connection point for electrically connecting the front shelf portion 12 to the support rails 30,31 via the back portion 14, because the bracket 20 is electrically conductive and is electrically connected to the cable 32 in the support rails 30,31.

To release the front shelf portion from the back shelf portion, a user can press down on the protruding button 49, so that the button 49 no longer lies within the hole 51, and pull the front portion away from the back shelf portion.

Also, when the user pulls the front shelf portion away from the back shelf portion, the connector portion 18 will release from the slot 24, because the triangular protrusion 21 of the connector portion 18 will be forced out of the slot.

In this example the front shelf portion 12 includes a moveable flap member 37 located on the front face of the front shelf portion 12. The flap member 37 is attached to the front shelf portion at points along an upper surface 38 and pivots about the attachment points. This allows a user to insert a sheet behind the flap member, the sheet having a chosen or predetermined logo or branding image on.

The flap member 37 in this example is transparent and so the logo or branding image can be seen by customers at the front of the shelf 10. Also, the flap member opens up to allow access to the LED light strip 36 in case access is required. The transparent flap member and sheet are located in close vicinity to, approximately adjacent to, the LED light strip 36. Therefore when the lights are turned on the lights will backlight the sheet, increasing the visual impact and intensity of the logo or branding image on the sheet to any customer.

In this example, the product display shelf 10 is used to hold product cassettes 70 (as shown in FIGS. 6a to 6d. The cassettes are a convenient way to hold a number of products at once, and are releasably attached to the display shelf. The display shelf 10 has features to enable the cassettes to be attached to the shelf as described below.

The front shelf portion 12 has an elongate ridge 44 located along a front edge region of the front shelf portion (as shown in FIG. 4). A product cassette may be provided with a complementary recess to receive the ridge 44. A number of projecting resiliently sprung wedges 46 are provided along a rear edge region of the back shelf portion 14. Each projecting sprung wedge is formed from a partial cut-out of the back shelf portion 14. The cut-out is located in a plane perpendicular to the shelf's upper surface. The face of the wedge 46 is at an angle greater than 90 degrees to the plane of the shelf's upper surface.

With this arrangement a suitably sized product cassette may be inserted and held snugly between the ridge 44 of the front shelf portion 12 and the sprung wedge 46 of the back shelf portion 14. The ridge 44 and the projecting sprung wedge 46 cooperate to maintain the product cassette on the shelf unit 10.

The product cassette may have any suitable design to hold products that are to be displayed.

Alternatively, in other examples a product cassette may be sized so as to form a push-fit or an interference fit in the shelf unit 10 (optionally without the ridge 44 and/or wedges 46 being necessary).

In another example, either a ridge or valley may be formed in the shelf's upper surface of the back shelf portion 14, extending laterally along the width of the shelf surface and protruding upwards or downwards. A product cassette (or a plurality of cassettes) may then be provided that has either a corresponding recess to accommodate the ridge, or a ridge accommodated by the valley, extending laterally across a downward facing surface of the cassette. Each formation is shaped so that the product cassette can be push fitted onto the product display shelf. For example, a valley 25 formed in the shelf's upper surface of the back shelf portion 14 is shown in FIGS. 6a and 6b. The product cassette 70 has a corresponding ridge 26 to fit into the valley 25. As shown in FIG. 6a the valley 25 and ridge 26 have a particular angled edge to help locate the cassette 70 by resting the front portion of the cassette on the lip 45 and then lowering the rear portion of the cassette towards the wedges 46 (FIG. 6b).

A benefit of locating the ridge on the back shelf portion 14 is that the product cassettes are anchored to the back shelf portion 14 independently of the front shelf portion 12. Therefore, a user may be able to change the front shelf portion without having to remove all of the merchandise cassettes prior to changing the shelf front (as shown in FIGS. 6c and 6d).

FIG. 2a shows the product display shelf 10 unattached to the support rails 30, 31. FIG. 2b shows the product display shelf hooked into elongate support rails 30, 31, but not secured into the support rails 30, 31. FIG. 2c shows the product display shelf secured into the support rails. As described above, the brackets 20 have a first end having a hook 22 to slot into recesses in the support rails 30, 31.

FIGS. 3a and 3b respectively show a side view and sectional view of the product display shelf 10 hooked into elongate support rails 30, 31, but not secured into the support rails 30, 31. In these figures there is also no power connection to the front shelf portion 12 because the connector portion 18 is not engaged with the bracket 20.

FIGS. 3c and 3d respectively show a side view and sectional view of the product display shelf 10 secured into the support rails 30, 31. In these figures there is also a power connection to the front shelf portion 12 because the connector portion 18 is engaged with the bracket 20.

The back shelf portion 14 is provided with lugs 13. The lugs 13 contribute to a mechanical locking feature between the back shelf portion 14 of the shelf unit 10. In the secured or locked position (FIGS. 2c, 3c and 3d), the lugs 13 are pushed into the recesses 34 of the support rails 30, 31 and therefore inhibit the removal of the hooks 22 of the brackets 20 from the support rails 30, 31. The lugs 13 consequently contribute to the mechanical locking feature because the hooks 24 of the brackets 20 are inhibited from vertical movement in the recesses 34 relative to the support rail because the recesses 34 are blocked by the lugs 13. Therefore, the hooks 24 cannot be moved vertically relative to the support rail because of the lugs 13.

During placement of the shelf unit 10 on the support rails 30, 31, the hooks 22 of the brackets 20 are inserted into the support rails 30, 31 by first locating the recesses 34 in the support rails and moving the hooks 22 relative to the recesses 34 to slot the brackets 20 into place as shown in FIGS. 2a, 2b, 3a and 3b. In a first position or unlocked position (FIGS. 2b, 3a, 3b), the electrically conductive brackets 20 are electrically connected to a power cable 32 within the support rails 30, 31.

To lock the shelf unit 10, the back shelf portion 14 is pushed towards the support rails 30, 31 so that the back shelf portion 14 slides relative to the brackets 20 into a second position, or locked position (FIG. 2c, 3c, 3d). The back shelf portion 14 of the shelf unit 10 abuts the support rails 30, 31 with the back shelf portion 14 forming a mechanical lock by inhibiting vertical movement of the hooks 22 of the brackets 20 relative to the recesses 34 of the support rails 30, 31.

Conveniently, in use, when a user pushes the front shelf portion 12 towards the back shelf portion 14 to engage the protrusion 48 with the hole 35, and the protrusion 21 with the slot 24, this action also pushes the lugs 13 into the recesses 34. It will be appreciated though that these actions may be made separately or in other combinations.

In the unlocked position shown in FIG. 2b, 3a, 3b, the hooks 22 of the brackets 20 are engaged in recesses 34, thus forming electrical connectivity with the power rail 32. In the unlocked position, no electrically connectivity is provided to the front shelf portion 12. There is electrically connectivity from the power rails 34 to the brackets 20 because the brackets are hooked into the support rails 30, 31 mechanically, and the hooks 22 make an electrical connection to the power rails 34 thus forming an electrical connection between the brackets 20 and the support rails 30, 31. In this arrangement, since there is no complete electrical circuit, electricity will not flow in the front shelf portion 12.

The shelf unit 10 is locked by pushing the front shelf portion 12 toward the support rails 30, 31. The bracket 20 electrically connects to the connector portion 18 of the front shelf portion 12 (FIG. 3c, 3d).

Locking the shelf unit 10 therefore provides dual functionality. Firstly, locking the shelf unit 10 mechanically inhibits the shelf unit 10 from removal from the support rails 30, 31.

Secondly, locking the shelf unit 10 electrically connects the front shelf portion, to the back shelf portion 14, to the power rail 32.

The shelf unit 10 may be unlocked from the locked position by sliding the back shelf portion 14 relative to the brackets 20, such that the lugs 13 withdraw from the recesses 34. The hooks 22 of the brackets 20 are then able to be moved in a vertical direction relative to the support rails 30, 31 to disengage the bracket 20 from the recesses 34 in support rails 30, 31.

The lugs 13 are sized to substantially fill the recess 34 after the hook 22 has been inserted into the recess 34 of the support rail. The recess 34 is rectangular shaped in this example. However, the person skilled will appreciate that the hook and recess must be adapted to complement each other and form both a stable mechanical connection, and an electrical connection between the brackets 20 and the support rails 30, 31.

The back shelf portion 14 extends across a suitable proportion of the shelf to ensure safe carrying of the required merchandise on the shelf. This is engineered using an interrelationship of the weight of the product, the second moment of area for the configuration and the mechanical properties of the materials and the interlocking features on the shelf and on the uprights. In this example the bracket extends almost to the front of the back shelf portion.

FIGS. 4(a) and 4(b) show cut-out views of the back shelf portion 14, the releasably attachable front shelf portion 12, and the bracket 20 in unlocked and locked positions respectively.

FIG. 4(a) shows the back shelf portion 14 in the unlocked position and thus the bracket 20 does not protrude sufficiently into the back shelf portion 14 to form an electrical connection to the back shelf portion 14.

The front shelf portion 12 is provided with a connector portion 18 to help releasably attach the front shelf portion 12 to the back shelf portion 13. In this example, the front shelf portion 12 has an open channel 19, adapted to slot into a corresponding recess 42 in the back shelf portion 14.

FIG. 4(b) shows the back shelf portion 14 connected to the front shelf portion 12. When the front and back shelf portions are connected, the protrusion 21 couples with the slot 24 of the bracket 20. This locked position thereby provides electrical connectivity between the front shelf portion and the back shelf portion 14.

With the above-described product display arrangement, a user can easily change the front shelf portion 12 to accommodate new branding and/or different shelf sizing. This may be achieved without having to move products from the back shelf portion 14 and/or without having to remove the entire shelf system from the support rail. This may be achieved without having to rewire a lighting system, if provided.

As such, the visual appearance of a product display shelf can be easily changed.

Also, by using a back shelf portion that remains in place and variable front shelf portions of different depths, the depth of the full product display shelf may be easily changed, for occasions when different sized products are to be displayed or different sized product cartridges are to be added.

The ability to quickly and easily change the entire product display apparatus by varying the front shelf portion 12 enables the user to inexpensively recreate new styles of shelving systems at a minimal cost. The convenience of being able to leave product cassettes and other products on the back shelf portion 14 is convenient.

In the event that shelf branding must be changed, only the front shelf portion need be changed. Therefore, the product display shelf provides a convenient, cost-effective system for meeting business needs in a rapidly changing commercial environment.

With the above-described locking arrangement the user is provided with immediate feedback regarding whether the product display shelf 10 is mechanically locked into the support rails 30, 31 because power is delivered to the back shelf portion and a light for example would inform the user that the back shelf portion 10 was safely locked into place in the support rails 30, 31.

A positive 30 and a negative 31 support rail are provided in the example described above. Typically, the power rail is provided with an AC or DC power supply such as a 12 volt power supply. Other embodiments may include a support rail having positive and a negative power rails 34 within the same support rail.

By providing a shelf that has two positions, a simple and safe means of delivering power to the shelf is provided. Locking the shelf provides dual functionality in that it mechanically secures the shelf into the support rail and locking the shelf forms electrical connectivity. The arrangement provides a product display shelf that is simple, safe and quick to install.

A product display apparatus may be manufactured by injection moulding or 3-D printing of the plastic components, for example.

Various modifications to the detailed designs as described above are possible.

For example, the front shelf portion need not include a LED light strip. As a further variation, with or without lighting on the front shelf portion, the back shelf portion may include lighting.

FIGS. 8*a* and 8*b* show an example where the back shelf portion 14 includes a LED light strip 28. The light strip 28 is located towards the front of the back shelf portion. In this way, a front shelf portion 12 may be connected to the back shelf portion and the light from the strip 28 will illuminate the display panel 33. The display panel 33 may include a front flap member under which imagery may be provided similar to that described previously, or may be another suitable panel (e.g. without a flap).

FIGS. 8*c* and 8*d* show another example, where the back shelf portion 14 includes a LED light strip 28 and the front shelf portion 12 includes a further LED light strip 29.

If used, illuminations means may be provided in various forms including a plurality of lighting elements, a plurality of LEDs, LCDs, or the like.

Various specific male-female type connections have been described above in relation to the connections between various combinations of the front and back shelf portions, the rail and the product cassettes. It will be appreciated that any of these connections could be reversed without affecting the functionality of the shelf.

The back shelf portion 14 may be provided with alternative detachable shelf front portions 12, e.g. a charger 40 (shown in FIG. 5), to charge a mobile phone or other electrical device while the device is on display.

Figure 5:
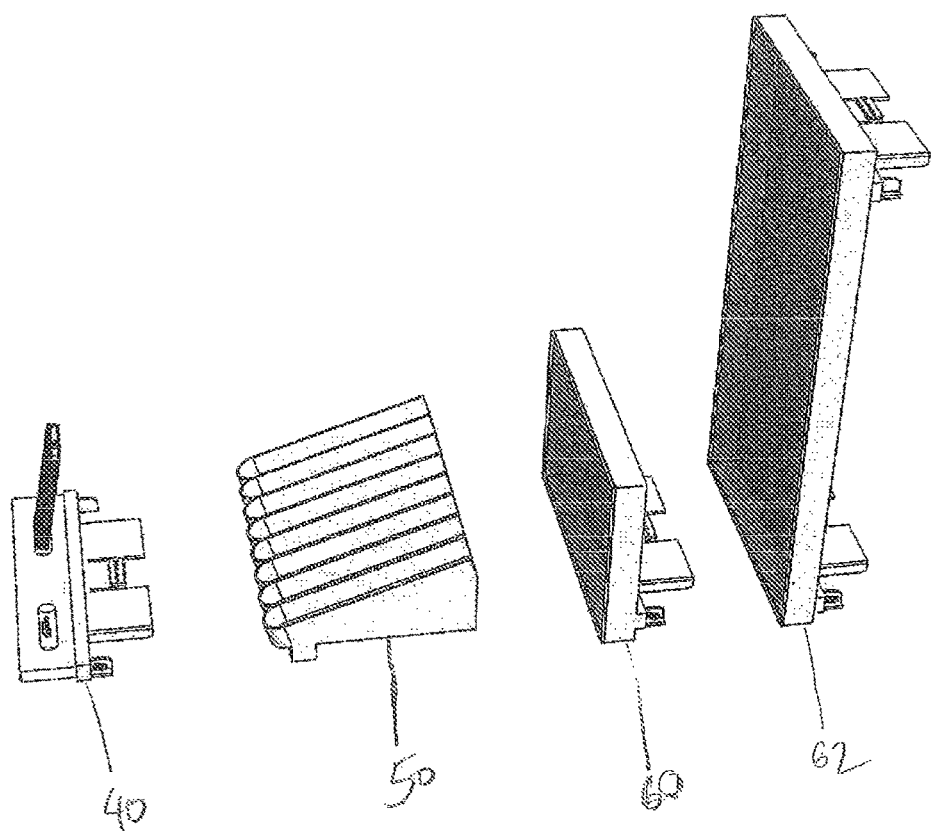
FIG. 5 illustrates a number of front shelf portions of a product display system.

The back shelf portion may be provided with other marketing devices such as speakers, illuminated cassettes 50, graphic light boxes 60, large span graphic light boxes 62 or liquid crystal display means as shown in FIG. 5.

Printed graphics, touch screens and electroluminescent panels may optionally be incorporated into the front shelf portion.

The overall shelf size, in particular, the shelf depth, may be varied easily by changing the depth of the front shelf portion. This is illustrated by the comparative views of FIGS. 9*a* to 9*d*. FIGS. 9*a* and 9*b* show a side view of a back shelf portion 14. In FIG. 9*a*, a relatively larger product cassette 70$_1$ is to be added to the shelf. A corresponding relatively deeper front shelf portion 12$_1$ is selected to connect with the back shelf portion 14. FIG. 9*c* shows the shelf and cassette of FIG. 9*a* connected together. In FIG. 9*b*, a relatively smaller product cassette 70$_2$ is to be added to the shelf. A corresponding relatively shorter (less deep) front shelf portion 12$_2$ is selected to connect with the back shelf portion 14. FIG. 9*d* shows the shelf and cassette of FIG. 9*b* connected together. In this way the shelf size may be easily varied to suit different products to be displayed. In another embodiment, a single support bracket may be used to support the back shelf portion on a rail (support member). Various other ways to support the back shelf on a support member may be used. Rather than hooks, it is possible to use plugs or other fastening device, or even a permanent attachment, e.g. a weldment or other adhesive.

Although as described above the front shelf portion is joined with the back shelf portion with a protrusion 48, other attachment means are possible. For example, the brackets and connector portions described above, which also join the front and back portions, may be used alone as the connecting element. Other suitable mechanical connections may be used, e.g. plug and socket type connections, hooks, fasteners or the like.

In certain embodiments, a lighting element may be positioned within the back shelf portion to effectively backlight a portion of the back shelf portion. A display portion may be provided within the back shelf portion, and the illumination means may be positioned so that the display portion is illuminated.

It will be clear to a person skilled in the art that features described in relation to any of the embodiments described above can be applicable interchangeably between the different embodiments. The embodiments described above are examples to illustrate various features of the invention.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A product display system comprising:
   a shelf unit comprising a back shelf portion and a front shelf portion, the back shelf portion and the front shelf portion releasably attached to each other to form a shelf wherein both of the back and front shelf portions are configured to provide support for a product to be displayed;
   wherein the back shelf portion comprises a first connecting element for releasably attaching the back shelf portion to an electrically powered support member, and the front shelf portion comprises a second connecting element for releasably attaching and electrically connecting the front shelf portion to the back shelf portion.

2. A product display system as claimed in claim 1, further comprising the electrically powered support member.

3. A product display system as claimed in claim 2, wherein the front shelf portion is electrically connected to the electrically powered support member via the back shelf portion.

4. A product display system as claimed in claim 1 wherein the front shelf portion includes an illumination element.

5. A product display system as claimed in claim 4, wherein the illumination element is or includes a light bulb, a light emitting diode, a liquid crystal display device, an electroluminescent device, a light emitting cell, a light emitting electrochemical cell or an organic light emitting diode.

6. A product display system as claimed in claim 1, wherein the first connecting element is or includes a hooked member configured to be inserted into a complementary recess in the electrically powered support member, or wherein the first connecting element is or includes a recess configured for receiving a complementary hooked member of the electrically powered support member.

7. A product display system as claimed in claim 1, wherein the second connecting element is or includes a protruding member configured to be insertable into a complementary recess in the back shelf portion.

8. A product display system as claimed in claim 7 wherein the protruding member is resiliently biased.

9. A product display system as claimed in claim 1 wherein the second connecting element is or includes a recess configured for receiving a complementary protruding member of the back shelf portion.

10. A product display system as claimed in claim 1 wherein the front shelf portion further comprises at least one conductive sprung contact member for resiliently engaging with a corresponding conductive track in the back shelf portion.

11. A product display system as claimed in claim 1 wherein the second connecting element is or includes a conductive element for engaging with a corresponding conductive track in the back shelf portion.

12. A product display system according to claim 1 further comprising an additional front shelf portion configured to be interchangeable with the front shelf portion, the back shelf portion and the additional front shelf portion releasably attachable to each other to form a shelf wherein both of the back and additional front shelf portions are configured to provide support for a product to be displayed, wherein the additional front shelf portion comprises a second connecting element for releasably attaching the additional front shelf portion to the back shelf portion.

13. A product display system according to claim 12 wherein the front shelf portion and the additional front shelf portions have different depths.

* * * * *